Nov. 15, 1932.   D. H. KILLEFFER   1,887,687
REFRIGERATING METHOD AND APPARATUS
Filed Dec. 9, 1929
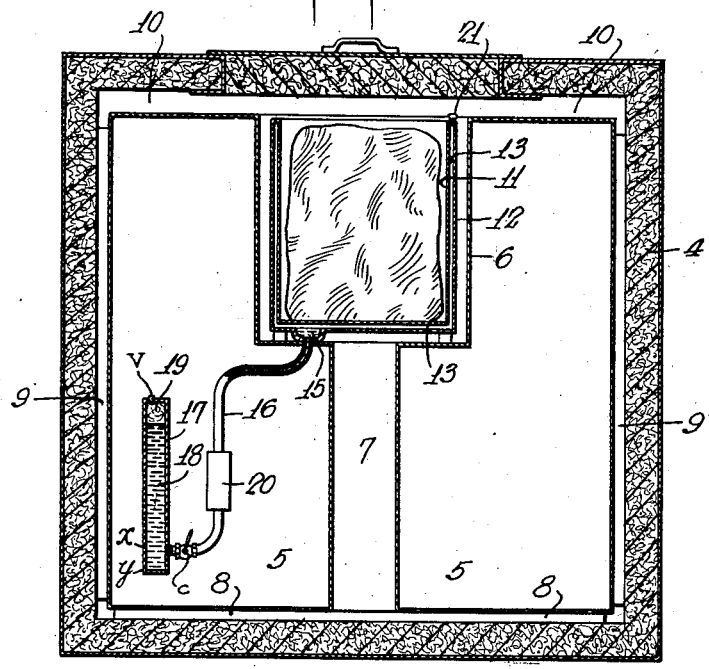
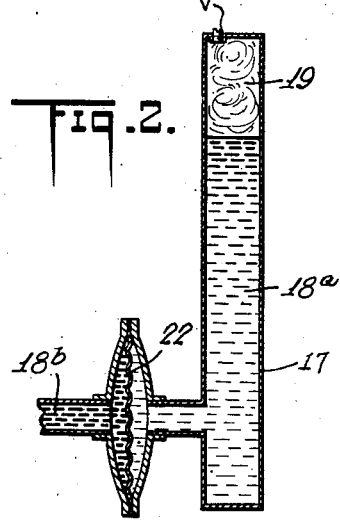
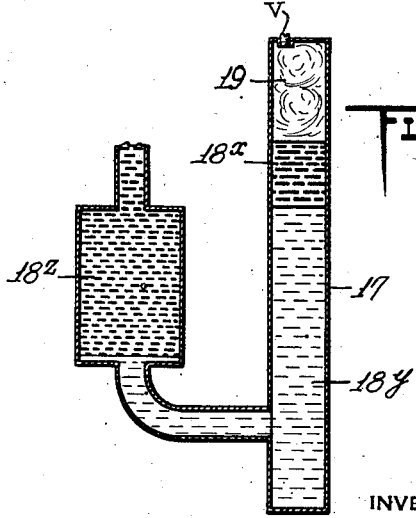
INVENTOR
David H. Killeffer
BY
ATTORNEY Patented Nov. 15, 1932

1,887,687

UNITED STATES PATENT OFFICE

DAVID H. KILLEFFER, OF YONKERS, NEW YORK, ASSIGNOR TO DRYICE EQUIPMENT CORPORATION, OF NEW YORK, N. Y., A CORPORATION OF DELAWARE

REFRIGERATING METHOD AND APPARATUS

Application filed December 9, 1929. Serial No. 412,749.

My present invention is related to that of companion application Ser. No. 410,749, now matured into Patent No. 1,870,864, in that it was primarily devised as a solution of certain problems connected with controlling the rate of melting of solid carbon dioxide by varying the rate of heat transfer thereto, but the principles involved may be applied in any relation where it is desired to vary the rate of heat exchange between any materials or gases of different temperatures, as for instance, varying the rate of cooling of hot water by cool air, or the like.

More specifically considered, the invention involves varying the conductivity of a wall separating the two materials or gases of different temperatures, by interposing or removing differently conducting fluid media between the heat receiving and the heat delivering surfaces of said wall. This requires double walls affording an interspace for the fluids.

More specifically considered, the invention involves the employment of a gas as the slowly conducting or heat insulating fluid and a liquid as the more rapidly conducting fluid to be substituted therefor when a higher rate of heat transfer is desired.

In said companion application, exterior means is employed for bodily forcing the liquid or other fluid of good heat conductivity to bridge the interspace between the double walls, but my present invention concerns the use of vapor pressure on a liquid to cause and to thermostatically control movement of the liquid into and out of the bridging relation. For instance, by my present invention a rise of temperature increasing vapor pressure may be utilized to bring the liquid into the bridging relation while fall of temperature and descreased vapor pressure will operate reversely. The required vapor pressure may be attained by the use of a volatile liquid like sulphuric ether, which affords a wide range of sensitive response to temperature variations; or the vapor pressure may be that of a gas that is highly soluble in the liquid, as for instance, carbon dioxide as the gas and water, alcohol, ether or gasolene as the absorbent liquid. I have discovered that remarkable results are obtainable by such carbon dioxide absorption and evolution method, but this is broadly claimed in my companion application, Ser. No. 412,750, only its specific application to the present situation being included in this application.

I have discovered that simple apparatus of rugged construction can be made to function in this way so as to produce temperature control within a remarkably close range under very trying conditions, as for instance, where an intense refrigerant such as solid carbon dioxide evaporating at, say, 110° F. below zero or less may be used to maintain temperatures near or above freezing in the storage space of a refrigerator.

The above and other features of my invention will be more evident from the following description in connection with the accompanying drawing, in which Fig. 1 is a vertical section indicating more or less diagrammatically a refrigerator showing one illustrative use of the invention; and Figs. 2 and 3 are similar views, showing in detail and on a larger scale, the thermo sensitive element with modified connections for transmitting liquid flow.

In Fig. 1 a refrigerator 4 of any desired construction is shown, for purposes of illustration, as provided with a lining affording storage space 5, 5, bunker 6 for the refrigerant, and a circulatory path for the gaseous cooling medium, downward through 7, across the bottom 8, upward through 9 and back through 10 to bunker 6.

In the bunker 6 is located a double walled vessel which may be shaped, proportioned and insulated in any of the various ways described in my companion application Ser. No. 410,-749. As shown, it is a rectangular box-like structure, comprising inner walls 11 and outer walls 12 affording an interspace 13. The inner wall 11 is exposed to solid carbon dioxide or other refrigerant contained therein, while the outer wall 12 is exposed to the circulation above described. As the circulating medium is of high temperature as compared with the solid carbon dioxide or other refrigerant in the receptacle, there is continuous heat transfer from the exterior to the interior through the interspace and the conductivity of this interspace is varied by introducing and removing liquid, as at 15. Gas, air or vapor in the interspace will transfer heat very slowly as compared with a liquid and introducing liquid to displace gas affords relatively good heat conducting path between the spaced apart walls forming the bottom of the receptacle. In the arrangement shown, the refrigerant rests on this bottom and mere filling of the bottom interspace with liquid, will usually be sufficient to afford the required regulation. Moreover, it gives maximum variations of conductivity for a minimum amount of liquid introduced. However, the liquid may be and frequently is introduced in sufficient quantities to fill up the side walls 11, 12 to a desired height.

Introduction or removal of the liquid is effected by power derived from the changes of vapor pressure in response to change of temperature of a suitable volatile or gas evolving liquid, the temperature sensitive device being located in the region, the temperature of which is to be controlled.

In the present case, a conduit 16 which may be 1/8 inch flexible copper tubing, connects the interspace 13 of the bunker 6 with a temperature-sensitive vapor bulb 17, located in refrigerated space 5. This bulb may be a length of ordinary metal pipe closed at both ends so that it can be hermetically sealed for normal operation. There is a gas space 19 above the liquid 18 and this space is preferably about 10% of the volume of the bulb 17. If desirable, an enlargement 20 may be interposed in the conduit 16 to prevent accidental sucking back of gas from 13 into the temperature bulb 17, under extreme conditions, as where there is no refrigerant to cool the interspace 13.

The vapor pressure characteristics of liquid 18 are important. Where the vapor is merely the volatilized liquid, I have obtained excellent results by the use of sulphuric ether. Also, as set forth and broadly claimed in companion application Ser. No. 412,750, I have obtained phenomenal efficiency by the use of various liquids saturated with gas, as for instance, ether, methyl alcohol, acetone, carbon bisulphide, ethylene dichloride and various other liquids saturated with carbon dioxide gas. However, any liquid, saturated or unsaturated, that will meet the conditions above set forth and that shows marked change of volatility on slight change of temperature, will operate very well; and any gas that is highly soluble in liquid may be used in the place of carbon dioxide gas.

The interspace 13 between the surfaces 11, 12, is primarily filled with a mixture of two or more gases, one or more of which will be easily absorbed in and evolved from the liquid. The less easily absorbed constituent may be air. The temperature effects on vapor pressure will depend on the percentages of the more absorbable and less absorbable constituents in the gas mixture. Assuming that these percentages are correct; that tube 16 is filled with liquid; and that the temperature bulb 17 is located in the atmosphere, or substance whose temperature is to be controlled, the operation will be as follows: When the temperature of the liquid in the bulb 17 is raised, the vapor pressure in the space 19 will increase, thus forcing the liquid 18 through the tube 16 and into the space 13. The level of the liquid will rise to a predetermined height and as it approaches the inner surface 11 the heat conductivity and rate of heat absorption will gradually increase; but, when the liquid actually contacts with both surfaces 11, 12, the rate of heat conduction will be suddenly and greatly increased by the complete all-liquid path thus substituted for the gas path. As the temperature in the refrigerated space 5, is thus lowered, the temperature of the liquid 18 within the bulb 17 will fall, thereby reducing the vapor pressure in 19, consequently drawing back the liquid from the interspace 13; and so on. By such repeating cycles, the temperature may be accurately regulated.

The bulb 17 may be set so as to cause the above described cycle of operations, at desired temperatures for the refrigerated space by filling in liquid having a high temperature-vapor-pressure rate of change, removing the plug screw V, and while in this condition subjecting the bulb to the desired normal temperature for the region 5. Thereupon the percentages of absorbable vapor and air within the vapor space will automatically adjust themselves to that normal temperature, whereupon the screw plug V is replaced, or the hole soldered up or otherwise sealed. Then, while the bulb is still at the desired normal temperature, pipe 16 may be attached and filled with liquid in any desired way, and to any desired extent.

The latter prescription of filling the pipe 16 with liquid in any desired way and to any desired extent may present difficulties in practice and to facilitate this part of the operation, I may insert a cut-off cock c, which may be closed while the bulb is being set for the desired normal temperature in the manner above described. The refrigerant, such as solid carbon dioxide, is then charged into the bunker, the vent plug 21 of the interspace is not in place and sufficient liquid poured in to fill the apparatus to the level indicated at 15, Fig. 1. Thereupon the percentages of the absorbable air and vapor in the interspace 13 will automatically adjust themselves to the evaporation temperature of the solid carbon dioxide, whereupon the screw plug 21 is replaced or the hole soldered up. As the interspace 13 is not subject to much variation, but remains at practically constant temperature of the sublimated carbon dioxide gas, throughout the operation of the device proper pressure conditions in the interspace may be expected to remain constant. With the normal equilibrium temperature of the bulb 17 and the interspace 13 thus predetermined, the cock $c$ is turned to open communication between the two bodies of liquid and thereafter the above cycle of regulating operations will take place automatically with only slight and unimportant variations such as may result from compression of the vapor in interspace 13 by intrusion of liquid from 18 through pipe 16.

I have discovered another novel and effective way of setting up the apparatus so as to secure the desired temperature-vapor-pressure condition, without the use of the vent screw plug V or the cock $c$, both of which latter may afford undesirable parts for tampering by unskilled operators. This new method is as follows: The bulb 17 is made with the space between the levels $x$—$y$ equal to the desired gas space. The precise volume of this gas space is not vitally important, but about 10% of the volume of the liquid has been found satisfactory in certain cases. The bulb 17 and attached tube 16 are filled with the desired liquid sufficiently so that when the bulb is inverted, the space $x$—$y$ is emptied. In this inverted position of the bulb, the other end of tube 16 is connected to space 15. If it is desired to maintain the liquid level in the space 15 above the entrance therein of tube 16, the proper quantity of liquid is then introduced through the vent opening 21, which is left open to serve as the breather for securing the desired vapor pressure. The temperature of the double walled bunker 11 is then brought to the temperature at which it will normally be maintained by the refrigerant, which may be solid carbon dioxide, and the temperature of the bulb 17 with its contents is gradually brought to the desired controlled temperature, in this case the temperature for the refrigerated space 5, 5. The bulb 17 and its contents thus being brought down to the desired temperature, the bulb 17, still upside down in the position referred to is manipulated to permit free exchange of gaseous medium between the space 13 and the space $x$—$y$. This interchange may be by raising the inlet of bulb 17 and the entire length of pipe 16, to bring them precisely on the level of the inlet 15 into the interspace 13 so that there is continuous free flow and interchange of gas between said spaces. The same result may be accomplished by raising the inlet of 17 alternately above and below the level of 15 to permit free bubbling back and forth. By the time the desired temperatures have become absolutely established both in the bunker and in the bulb, the desired percentages of the two or more gases or vapors in the bulb will be thus attained. The vent 21 is then hermetically sealed and the bulb 17 turned rightside up and returned to its normal operating position in the refrigerated space 5, as shown. The controller is then in condition to operate on precisely the temperature differences which were thus predetermined.

The bulb in Fig. 2 may be quite similar to that in Fig. 1, but a flexible partition 22 is interposed between the vapor sensitive liquid $18a$ and the operating liquid $18b$. Such an arrangement permits of a different liquid being used in the bulb from that used in the remainder of the system. This may be desired for various reasons, as, for example, a liquid that might function well in the bulb might not be so satisfactory as some other liquid as concerns conducting heat through the interspace 13.

A special case where the interposed diaphragm might be desirable is where the vapor sensitive liquid $18a$ is ether saturated with carbon dioxide gas at a low temperature. In such case, there would be a tendency for the carbon dioxide gas to work its way into the bulb 17, through the ether column in tube 16 and out of the interspace 13, thereby upsetting the vapor density condition at 19. The use of the diaphragm would prevent such loss of carbon dioxide gas and a cheaper liquid such as kerosene or gasolene could be used for the controlled liquid $18b$ on the other side of the diaphragm.

Fig. 3 shows a modification in which a liquid $18y$ serves the function of a separator between the vapor sensitive liquid $18x$ and the operated liquid $18z$. In the particular case, $18x$ might be gasolene or pentane containing carbon dioxide gas, the mechanical separating liquid $18y$ might be a water solution of glycerine, alcohol or any suitable mixture or solution that will be of greater specific gravity, and not miscible with the sensitive liquid $18x$, yet will be non-freezing at the desired temperatures. The operated liquid $18z$ could be gasolene not containing dissolved carbon dioxide gas; or any other liquid of less specific gravity than and not miscible with the separating liquid $18y$, yet non-freezing and non-boiling at the desired temperatures. Where this liquid $18z$ is gasolene, the atmosphere and the interspace 13 would be air or other gas relatively insoluble in gasolene.

I have used the term bulb throughout the specification and claims in a broad sense, meaning any container or chamber arranged so that the movement caused by a change in vapor pressure within the chamber will be transferred to a movable means.

The principles and apparatus herein described may be used wherever it is desired to transfer heat; the temperatures might both be either high or low, but, of course different. I do not mean to limit myself to the one idea of transferring heat from a substance to be refrigerated to a refrigerant or vice versa.

I claim:

1. The method which includes causing heat transfer from a refrigerant region maintained at approximately constant low temperature by evaporation of solid carbon dioxide to a region to be refrigerated by conduction of heat from the latter region to said solid carbon dioxide to evaporate the same and also by the cooling effects of the refrigerant gas thus produced, and controlling the rate of heat transfer by interposing a double wall and interspace as a heat conducting path between the refrigerated region and the solid carbon dioxide; and variably controlling the heat conductivity of the interspace, by confining a relatively small body of liquid affording relatively small heat storage capacity and having a high rate of temperature-vapor-pressure variation and arranged in heat transfer relation to the refrigerated region; and utilizing changes of said vapor pressure to force flow of liquid having a lower freezing point than said solid into said interspace to increase heat conductivity when the vapor pressure increases and out of said interspace to decrease conductivity when the vapor pressure decreases.

2. A method specified by claim 1 and wherein the vapor pressure for a desired range of temperature control is predetermined by venting the confined vapor above upper surface of the liquid and then bringing said vapor and liquid to the desired temperature of the refrigerated region.

3. A method of varying the rate of transfer of heat between a region maintained at a relatively constant temperature and a region the temperature of which is to be controlled thereby, which method includes interposing between said regions a double wall affording a relatively thin, small volume interspace, and varying the conductivity of the interspace by utilizing changes of vapor pressure in a closed space above a body of liquid whose vapor pressure is sensitive to a change in temperature, located in heat transfer relation to the controlled-temperature region, to force liquid into and withdraw it from said interspace said closed space being of small volume and negligible heat storage capacity so that the heat absorbed or evolved to effect said changes of vapor pressure, is negligible as compared with the refrigerative heat transfer controlled thereby.

4. In the method specified by claim 3, the step of predetermining the vapor pressure for a desired range of temperature control which includes venting the upper surface of the liquid to atmosphere and bringing said liquid to the desired temperature of the refrigerated region.

5. A vessel containing solid carbon dioxide having at least one wall double so as to afford a small volume interspace, a container located in a space to be refrigerated by the heat transfer from said vessel enclosing a liquid and absorbable gas or vapor therefrom, a tube connecting said container with said interspace, said tube being filled with liquid, whereby with a change in vapor pressure within the container, liquid will be forced into or drawn from said interspace.

6. A vessel adapted to contain an approximately constant temperature refrigerant, and having a double wall adapted to afford a small volume interspace between the walls, a temperature bulb containing a highly volatile liquid and vapor pressure space over said liquid located in a space to be refrigerated by said vessel, a tube filled with the same liquid and connecting said bulb with said interspace and said interspace also constituting a vapor pressure space for said liquid.

7. A vessel containing solid carbon dioxide and having a double wall affording an interspace between the walls containing carbon dioxide gas, a tube filled with a volatile liquid connecting said interspace with a vapor pressure operated temperature bulb containing a quantity of the same liquid located in a space to be refrigerated by said vessel, a vapor pressure space over said liquid, said vapor pressure space containing a mixture of the vapor of the liquid and carbon dioxide gas.

8. A temperature bulb containing a volatile liquid and vapor pressure space over said liquid, a tube having a liquid containing enlargement therein, both tube and enlargement being filled with a quantity of the same liquid as is the temperature bulb and connecting said bulb with an interspace between the walls of a double-walled vessel, said interspace containing vapor of said liquid or a mixture of said vapor and air.

9. In a temperature controller, a double-walled vessel, a space between the walls of said vessel for the reception of a liquid, a vapor pressure operated temperature bulb, a tube filled with liquid and connecting said bulb with said space, the system containing different liquids that are immiscible.

10. A double-walled vessel, an interspace between the walls of said vessel for the reception of a liquid, a vapor pressure operated temperature bulb, a tube filled with liquid connecting said bulb with said space and a yieldable partition element arranged in said tube.

11. A refrigerator having a compartment for holding solid carbon dioxide and passages surrounding the interior of the refrigerator to accommodate the gas flowing from said solid, in combination with a double-walled vessel located in said compartment and having an interspace between the walls and containing said solid carbon dioxide; a tube filled with liquid connecting said interspace with a vapor pressure operated temperature bulb positioned within the refrigerated space, whereby with a variation in temperature of the atmosphere within the refrigerator the vapor pressure within said bulb will also vary, thereby forcing said liquid into or drawing it from the interspace between the walls.

12. The method of setting up a temperature controlled refrigerating system including a small volume bulb connected by a pipe with the interspace in the double wall of a vessel containing solid carbon dioxide, which method includes placing the desired quantity of gas or vapor yielding liquid in the bulb and tube, inverting the bulb, venting the double-walled vessel and bringing it to the temperature at which it will normally be used, venting the bulb and bringing the temperature of the bulb and its contents to the desired controlled temperature; then sealing the vents and returning the bulb to its upright position.

13. A method of refrigeration which includes maintaining a heat transfer wall or element at approximately constant low temperature by continuously evaporating in heat transfer relation to one surface of said element, a refrigerant having an evaporation temperature which is very low as compared with the temperature to be maintained in the refrigerating space; and controlling variations in the higher temperature of the refrigerated space by interposing between said element and said space a second wall affording an interspace between the refrigerated region and the refrigerant; and variably controlling the heat conductivity of the interspace by interposing a conducting liquid of lower freezing point than said refrigerant when the temperature of said refrigerated space falls below a desired minimum and removing said liquid when said temperature exceeds a desired maximum; and controlling such operations by confining a relatively small amount of gas and absorbent liquid affording practically negligible heat storage capacity but having a high rate of temperature-vapor-pressure variation, arranged in heat transfer relation to the refrigerated space and operating in response to temperature variations in said space; and utilizing changes of said vapor pressure to force flow of non-freezing liquid into said interspace to increase its heat conductivity when the vapor pressures increased by heat absorption from said refrigerated space, and out of said interspace to decrease conductivity when the vapor pressure decreases through decrease in temperature of said refrigerated space.

14. Heat transfer apparatus, including walls defining a refrigerant space and a space to be refrigerated thereby, and including a double wall having an interspace interposed between said refrigerant and refrigerated spaces, and means for varying the conductivity of the interspace including a heat conducting container located in heat transfer relation to the region or material which is to be refrigerated, and enclosing a relatively small amount of liquid whose vapor pressure is sensitive to a change in temperature and vapor of said liquid having a high rate of change of vapor density in response to a change in temperature but relatively small heat storage capacity: and intermediate liquid conduit means transmitting changes of said vapor pressure to force liquid into and withdraw it from said interspace to increase or decrease its heat conductivity correlatively with the changes of temperature in said refrigerated space.

15. Apparatus according to claim 14 and wherein the percentages of gases or vapors in the heat conducting container predetermine the vapor pressure for a desired temperature range of the refrigerated space.

Signed at New York in the county of New York, and State of New York this 6th day of December, A. D. 1929.

DAVID H. KILLEFFER.